United States Patent
Fukuda et al.

(10) Patent No.: US 12,246,252 B2
(45) Date of Patent: Mar. 11, 2025

(54) NON-TRANSITORY STORAGE MEDIUM ENCODED WITH COMPUTER READABLE PROGRAM, GAME DEVICE, AND METHOD OF CONTROLLING GAME DEVICE, THAT ALLOW EARLY START OF OPERATION OF PLAYER CHARACTER WHILE GAME INFORMATION IS APPROPRIATELY CONVEYED

(71) Applicant: NINTENDO CO., LTD., Kyoto (JP)

(72) Inventors: Yoshiteru Fukuda, Kyoto (JP); Seita Inoue, Kyoto (JP); Yosuke Morimoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 120 days.

(21) Appl. No.: 18/341,171

(22) Filed: Jun. 26, 2023

(65) Prior Publication Data

US 2024/0024773 A1 Jan. 25, 2024

(30) Foreign Application Priority Data

Jul. 22, 2022 (JP) .................. 2022-117066

(51) Int. Cl.
*A63F 13/53* (2014.01)
*A63F 13/5252* (2014.01)
*A63F 13/56* (2014.01)

(52) U.S. Cl.
CPC .......... *A63F 13/53* (2014.09); *A63F 13/5252* (2014.09); *A63F 13/56* (2014.09); *A63F 2300/303* (2013.01); *A63F 2300/307* (2013.01)

(58) Field of Classification Search
CPC ...... A63F 13/53; A63F 13/5252; A63F 13/56; A63F 2300/303; A63F 2300/305; A63F 2300/307

(Continued)

(56) References Cited

U.S. PATENT DOCUMENTS 10,558,546 B2 * 2/2020 Cranfill ................. H04L 63/108
10,983,590 B2 * 4/2021 Kuwatani ............ G02B 27/017
(Continued)

FOREIGN PATENT DOCUMENTS

JP  2003-117227  4/2003
JP  2003-325983  11/2003
(Continued)

OTHER PUBLICATIONS

Apr. 2, 2024 Office Action issued in Japanese Patent Application No. 2022-117066, pp. 1-4 [machine translation included].
(Continued)

*Primary Examiner* — Allen Chan
(74) *Attorney, Agent, or Firm* — Nixon & Vanderhye PC

(57) ABSTRACT

A non-transitory storage medium encoded with a computer readable program executed by a computer of a game device, at least one computer being configured to perform operations comprising obtaining data for determining a message to be shown while a game is running and performing conveyance processing for generating and providing a first image including a plurality of messages indicating game information of the game based on the obtained data such that the plurality of messages are sequentially shown. When the conveyance processing is terminated and the game processing is started, the second image further including a plurality of messages indicating the game information of the game based on the obtained data is generated and provided such that the plurality of messages are automatically sequentially shown.

12 Claims, 14 Drawing Sheets

(58) Field of Classification Search
USPC .......................................................... 463/31
See application file for complete search history.

(56) References Cited

U.S. PATENT DOCUMENTS

| | | | |
|---|---|---|---|
| 2003/0069052 A1 | 4/2003 | Higashiyama et al. | |
| 2003/0228909 A1 | 12/2003 | Tanaka et al. | |
| 2014/0179377 A1* | 6/2014 | Song | H04M 1/72403 455/566 |
| 2016/0016077 A1* | 1/2016 | Yokota | H04L 51/046 463/42 |
| 2017/0199627 A1 | 7/2017 | Ikeda et al. | |

FOREIGN PATENT DOCUMENTS

| | | |
|---|---|---|
| JP | 2016-006613 | 1/2016 |
| JP | 2018-114241 | 7/2018 |
| JP | 2018-137673 | 8/2018 |

OTHER PUBLICATIONS

"A fine improvement to expect with "Splatoon 3" [Casual Serious]", Inside, URL:https://www.inside-games.ip/article/2022/05/05/138048.html, May 5, 2022, retrieved on Mar. 22, 2024, pp. 1-4.

"The priority of the information in the Star Trigger notice UI is too high, so I thought about it in the evaluation of UX principles—UI design for game apps", URL:https://appgameui.hatenablog.com/entry/2020/07/04/000000 Jul. 4, 2020, retrieved on Mar. 22, 2024, pp. 1-6.

"Star Trigger Part 2, Im still not good at it, but I'm doing my best", YouTube, URL:https://www.youtube.com/watch?v=7s-ZC_suG58 Sep. 22, 2017, retrieved on Mar. 22, 2024, p. 1.

"Sukusto Live commentary Part 1 I started Sokusto School Girl Strikers", YouTube, URL:https://www.youtube.com/watch?v=YRQwNSH9G-s Dec. 24, 2017, retrieved on Mar. 22, 2024, p. 1.

Nintendo Official Guide Book Splatoon 2, "Check Latest Information on Inkopolis News!", SHOGAKUKAN, Aug. 4, 2017, p. 17, Partial English Translation attached, 2 pages.

* cited by examiner

FIG.3
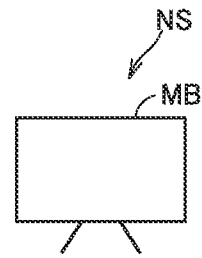
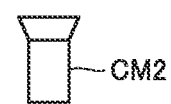
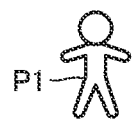
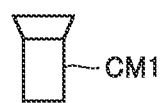

FIG.7A

| MESSAGE | PRIORITY FLAG | COMPLETION FLAG |
|---|---|---|
| MS1 | 1 | 1 |
| MS2 | 1 | 1 |
| MS3 | 1 | 1 |
| MS4 | 1 | 1 |
| MS5 |  | 1 |
| MS6 |  | 1 |
| MS7 |  | 1 |
| MS8 |  | 1 |
| ⋮ | ⋮ | ⋮ |

FIG.7B

| MESSAGE | PRIORITY FLAG | COMPLETION FLAG |
|---|---|---|
| MS11 |  | 1 |
| MS12 |  | 1 |
| MS13 |  |  |
| MS14 |  |  |
| ⋮ | ⋮ | ⋮ |

NON-TRANSITORY STORAGE MEDIUM ENCODED WITH COMPUTER READABLE PROGRAM, GAME DEVICE, AND METHOD OF CONTROLLING GAME DEVICE, THAT ALLOW EARLY START OF OPERATION OF PLAYER CHARACTER WHILE GAME INFORMATION IS APPROPRIATELY CONVEYED

This nonprovisional application claims priority on Japanese Patent Application No. 2022-117066 filed on Jul. 22, 2022 with the Japan Patent Office, the entire contents of which are hereby incorporated by reference.

FIELD

The present disclosure relates to a program and particularly to a message shown while a game is running.

A plurality of messages indicating game information such as a rule or stage information of a game changed over time have conventionally been shown at the time of start-up of a game.

BACKGROUND AND SUMMARY

Some users, on the other hand, may desire to operate a player character in a game as early as possible instead of representation of a message. In that case, however, game information may not appropriately be conveyed.

The present disclosure was made to solve a problem as above, and an object thereof is to provide a non-transitory storage medium encoded with a computer readable program, a game device, and a method of controlling a game device that allow early start of an operation of a player character while game information is appropriately conveyed.

A non-transitory storage medium encoded with a computer readable program executed by a computer of a game device according to one example of the present disclosure, at least one computer being configured to perform operations including obtaining data for determining a message to be shown while a game is running, performing conveyance processing for generating and providing a first image including a plurality of messages indicating game information of the game based on the obtained data such that the plurality of messages are sequentially shown, performing game processing after the conveyance processing ends, the game processing including movement control processing for moving a player character in a virtual space based on a first operation input by a user, first control processing based on a position in the virtual space of the player character, and image generation processing for generating a second image including at least an image based on a first virtual camera that moves together with the player character, and terminating the conveyance processing and starting the game processing when a second operation input by the user is provided while the conveyance processing is performed. When the conveyance processing is terminated and the game processing is started, the second image further including a plurality of messages indicating game information of the game based on the obtained data is generated and provided such that the plurality of messages are automatically sequentially shown. According to the configuration, when the second operation input by the user is provided while the conveyance processing is performed, the conveyance processing is terminated and the game processing is started, and the plurality of messages indicating the game information are automatically sequentially shown. Therefore, while the game information is appropriately conveyed, operations of a player character can be started early.

In the exemplary embodiment, whether to perform the conveyance processing or to perform the game processing and generate and provide the second image further including the plurality of messages such that the plurality of messages are automatically sequentially shown is determined based on the obtained data. According to the configuration, since whether to perform the conveyance processing or to perform the game processing and generate and provide the second image further including the plurality of messages such that the plurality of messages are automatically sequentially shown is determined based on the data, the game information can appropriately be conveyed to the user.

In the exemplary embodiment, when the data obtained while the game processing is performed includes specific data, the conveyance processing is performed, and when the data obtained while the game processing is performed does not include the specific data, the game processing is performed and the second image further including the plurality of messages is generated and provided such that the plurality of messages are automatically sequentially shown. According to the configuration, when specific data is included, the conveyance processing is performed. When specific data is not included, the game processing is performed and the second image including the plurality of messages is generated and provided such that the plurality of messages are automatically sequentially shown. Therefore, the game information corresponding to the specific data can appropriately be conveyed to the user.

In the exemplary embodiment, at the time of start-up of the game, it is determined to perform the conveyance processing regardless of whether the obtained data includes the specific data. According to the configuration, since the conveyance processing is performed at the time of start-up of the game, the game information can reliably be conveyed to the user and expectations for the game at the time of start-up of the game can be enhanced.

In the exemplary embodiment, when the obtained data includes the specific data and when the user provides the second operation input while the conveyance processing is performed, the conveyance processing is not terminated. According to the configuration, the game information corresponding to the specific data can reliably be conveyed to the user.

In the exemplary embodiment, when the obtained data includes the specific data and non-specific data, conveyance processing for generating and providing a first image including a plurality of first messages indicating game information of the game based on the obtained specific data such that the plurality of first messages are sequentially shown is performed, and thereafter conveyance processing for generating and providing a first image including a plurality of second messages indicating game information of the game based on the obtained non-specific data such that the plurality of second messages are sequentially shown is further performed. When the second operation input by the user is provided while the conveyance processing for generating and providing the first image including the plurality of second messages such that the plurality of second messages are sequentially shown is performed, the conveyance processing is terminated and the game processing is started. According to the configuration, while important information on the game, for example, corresponding to specific data is reliably conveyed to the user earlier through the conveyance processing, processing for conveyance of ordinary game information is terminated and the game processing is started, and a plurality of messages indicating the game information can automatically sequentially be shown. Therefore, appropriate conveyance in accordance with importance of the game information can be achieved. After the game processing is started, the process does not have to return to the conveyance processing, for example, in order to convey important game information, and operations of a player character can be focused on.

In the exemplary embodiment, the second image further including a plurality of messages indicating game information of the game is generated and provided such that the plurality of messages are automatically sequentially shown in an outer area other than a central area. According to the configuration, while an image of the game is visually recognized in such a manner that at least the central area of the image of the game is not hidden by the message, a player character can be moved in the virtual space based on the first operation input by the user.

In the exemplary embodiment, when the conveyance processing is terminated and the game processing is started, the second image further including a message indicating game information subsequent to game information corresponding to a message conveyed in immediately preceding conveyance processing is generated and provided such that the messages are automatically sequentially shown from the subsequent messaged. According to the configuration, when the game processing is started, messages are automatically sequentially shown from a message indicating next game information. Therefore, information that has visually been recognized does not have to be viewed again, and conveyance to the user can be efficient.

In the exemplary embodiment, conveyance processing for generating and providing the first image obtained by image pick-up of the virtual space by a second virtual camera fixed at a prescribed position in the virtual space is performed. According to the configuration, while the world view is consistent owing to the presence of the first and second virtual cameras in the same virtual world, the user can concentrate to information on the game by the presence of the fixed second virtual camera.

In the exemplary embodiment, when a third operation input by the user is provided while the game processing is performed, the game processing is terminated and the conveyance processing is started. According to the configuration, since the conveyance processing can be started in accordance with the operation input by the user, conveyance in accordance with user's intention can be achieved.

A game device according to another example of the present disclosure obtains data for determining a message to be shown while a game is running, performs conveyance processing for generating and providing a first image including a plurality of messages indicating game information of the game based on the obtained data such that the plurality of messages are sequentially shown, performs game processing after the conveyance processing ends, the game processing including movement control processing for moving a player character in a virtual space based on a first operation input by a user, first control processing based on a position in the virtual space of the player character, and image generation processing for generating a second image including at least an image based on a first virtual camera that moves together with the player character, and terminates the conveyance processing and starts the game processing when a second operation input by the user is provided while the conveyance processing is performed. When the conveyance processing is terminated and the game processing is started, the second image further including a plurality of messages indicating game information of the game based on the obtained data is generated and provided such that the plurality of messages are automatically sequentially shown. According to the configuration, when the second operation input by the user is provided while the conveyance processing is performed, the conveyance processing is terminated and the game processing is started, and the plurality of messages indicating the game information are automatically sequentially shown. Therefore, while the game information is appropriately conveyed, operations of a player character can be started early.

A method of controlling a game device according to yet another example of the present disclosure includes obtaining data for determining a message to be shown while a game is running, performing conveyance processing for generating and providing a first image including a plurality of messages indicating game information of the game based on the obtained data such that the plurality of messages are sequentially shown, performing game processing after the conveyance processing ends, the game processing including movement control processing for moving a player character in a virtual space based on a first operation input by a user, first control processing based on a position in the virtual space of the player character, and image generation processing for generating a second image including at least an image based on a first virtual camera that moves together with the player character, and terminating the conveyance processing and starting the game processing when a second operation input by the user is provided while the conveyance processing is performed. The performing game processing includes generating and providing, when the conveyance processing is terminated and the game processing is started, the second image further including a plurality of messages indicating game information of the game based on the obtained data such that the plurality of messages are automatically sequentially shown. According to the configuration, when the second operation input by the user is provided while the conveyance processing is performed, the conveyance processing is terminated and the game processing is started, and the plurality of messages indicating the game information are automatically sequentially shown. Therefore, while the game information is appropriately conveyed, operations of a player character can be started early.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 shows an exemplary illustrative non-limiting drawing illustrating a configuration of a virtual space of a game based on the embodiment.

FIGS. 7A and 7B show exemplary illustrative non-limiting drawings illustrating a data table of a message based on the embodiment.

DETAILED DESCRIPTION OF NON-LIMITING EXAMPLE EMBODIMENTS

Figure 1:
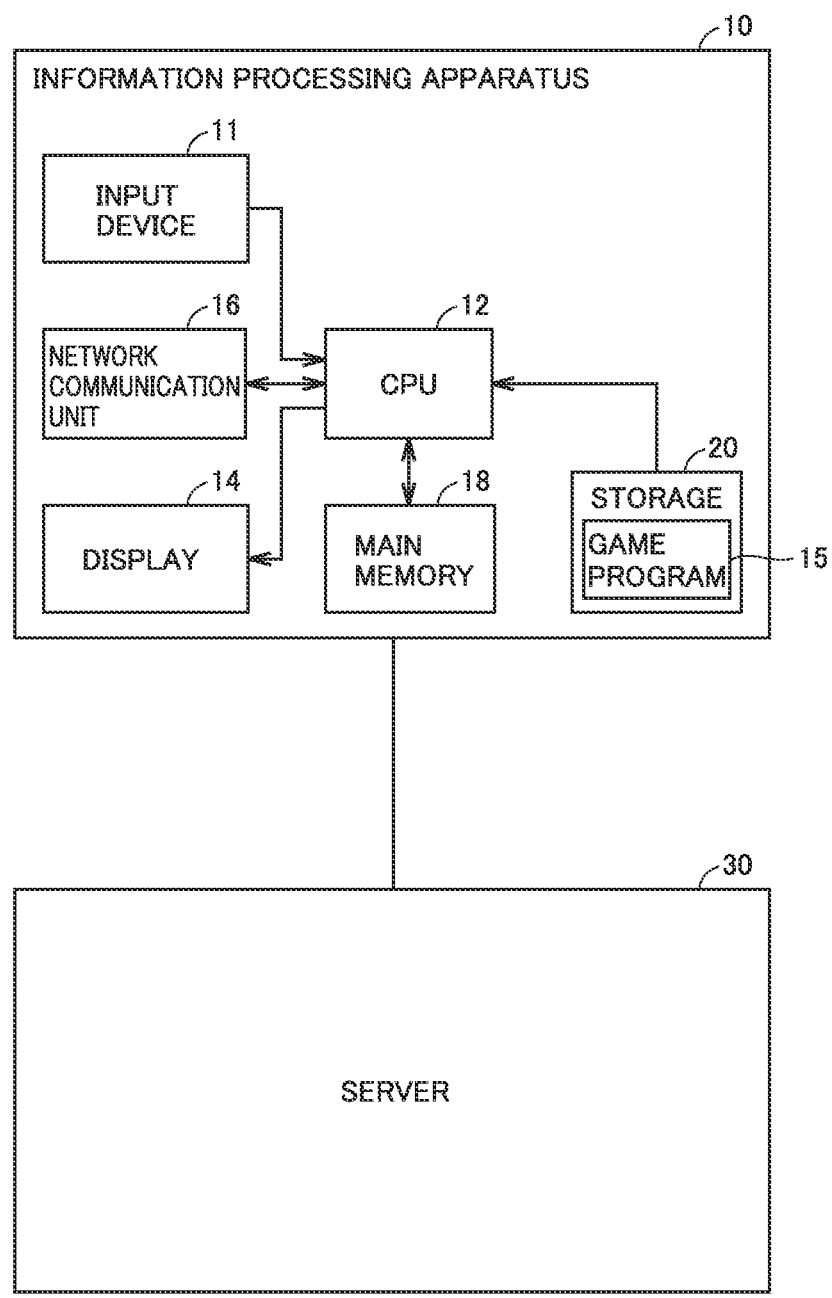
FIG. 1 shows an exemplary illustrative non-limiting drawing illustrating overview of a configuration of an information processing system 1 based on an embodiment.

This embodiment will be described in detail with reference to the drawings. The same or corresponding elements in the drawings have the same reference characters allotted and description thereof will not be repeated.

[A. Configuration of Information Processing System]

FIG. 1 is a diagram illustrating an overview of a configuration of an information processing system 1 based on an embodiment.

Referring to FIG. 1, information processing system 1 includes a server 30 and an information processing apparatus 10 provided to communicate with server 30.

By way of example, a configuration in which information processing apparatus 10 based on the embodiment is implemented as a game device will be described.

Information processing apparatus 10 is any computer. Information processing apparatus 10 may be, for example, a portable (also referred to as mobile) device such as a portable game device, a portable telephone, or a smartphone, a stationary apparatus such as a personal computer or a home game console, or a large apparatus such as an arcade game machine for a commercial purpose.

A hardware configuration of information processing apparatus 10 is outlined below.

Information processing apparatus 10 includes a CPU 12 and a main memory 18. CPU 12 is an information processor that performs various types of information processing in information processing apparatus 10. CPU 12 performs the various types of information processing by using main memory 18.

Information processing apparatus 10 includes a storage 20. Various programs (which may include an operating system in addition to a game program 15) to be executed in information processing apparatus 10 are stored in storage 20. Any storage (storage medium) accessible by CPU 12 is adopted as storage 20. For example, a storage embedded in information processing apparatus 10 such as a hard disk or a memory, a storage medium attachable to and removable from information processing apparatus 10 such as an optical disc or a cartridge, or combination of a storage and a storage medium as such may be adopted as storage 20. In such a case, a game system representing an exemplary information processing system including information processing apparatus 10 and any storage medium may be configured.

Game program 15 includes computer-readable instructions for performing information processing as will be described later. The program may also include a program that establishes data communication with server 30 and a program that establishes data communication with another information processing apparatus as a part of processing.

Information processing apparatus 10 includes an input device 11 that accepts an instruction from a user, such as an analog stick, a button, or a touch panel. Information processing apparatus 10 includes a display 14 that shows an image generated through information processing. Without being limited to the configuration, various input forms and representation forms can be adopted.

Information processing apparatus 10 includes a network communication unit 16. Network communication unit 16 may be connected to a not-shown network and may perform processing for data communication with an external apparatus (for example, server 30 or another information processing apparatus).

Information processing apparatus 10 obtains from server 30 through network communication unit 16, data for determining a message to be shown while a game is running.

Server 30 transmits to information processing apparatus 10 as necessary, various types of data for determining a message to be shown while the game is running Specifically, server 30 transmits to information processing apparatus 10, data associated with specific data or non-specific data. The specific data refers to data indicating information for reliably conveying game information to the user in conveyance of the game information to the user. The non-specific data refers to data indicating permission also of an operation of a player character in conveyance of game information to the user.

Server 30 may transmit the data at any timing or every prescribed time period. By way of example, server 30 may transmit data associated with non-specific data every prescribed time period in one day, or may transmit data associated with specific data when necessary in step with transmission of data associated with such non-specific data.

For example, server 30 may transmit, for example, data of "today's news" as data associated with specific data. By way of example, server 30 may transmit information sent by a game provider who runs a game or information on update of a game (update information). Information on a special event may be transmitted as information sent by the game provider, or information on a new weapon may be transmitted as the information on update of the game. By way of example, information on a reward such as acquisition of a privilege based on achievement of a prescribed condition within a specified period or information on a draw for an award and information on a period therefor may be included as the information on the special event.

Alternatively, server 30 may transmit, for example, data of a "current battle stage" as data associated with non-specific data. By way of example, server 30 may transmit game information that changes over a period or over time. For example, server 30 may transmit information on a battle stage that changes every two hours. Each time a stage changes, a rule may also change and information thereon may be transmitted. For example, information on a rule of a game, what is each of a plurality of stages, and information on whether or not to hold another mini game may be included.

Information processing apparatus 10 may be implemented by a plurality of apparatuses. For example, information processing apparatus 10 may be implemented by a main body apparatus including CPU 12 and an apparatus including input device 11 and/or display 14, which are separate from each other. For example, in another embodiment, information processing apparatus 10 may be implemented by a main body apparatus and a terminal device including input device 11 and display 14, or by a main body apparatus and an operation apparatus including input device 11. Information processing apparatus 10 may employ a television as a display apparatus, without including display 14.

In another embodiment, at least some of information processing performed in information processing apparatus 10 may be performed as being distributed among a plurality of apparatuses that can communicate over a network (a wide range network and/or a local network). Specifically, server 30 may perform at least some of information processing performed by information processing apparatus 10.

[B. Functional Configuration of Information Processing Apparatus 10]

Figure 2:
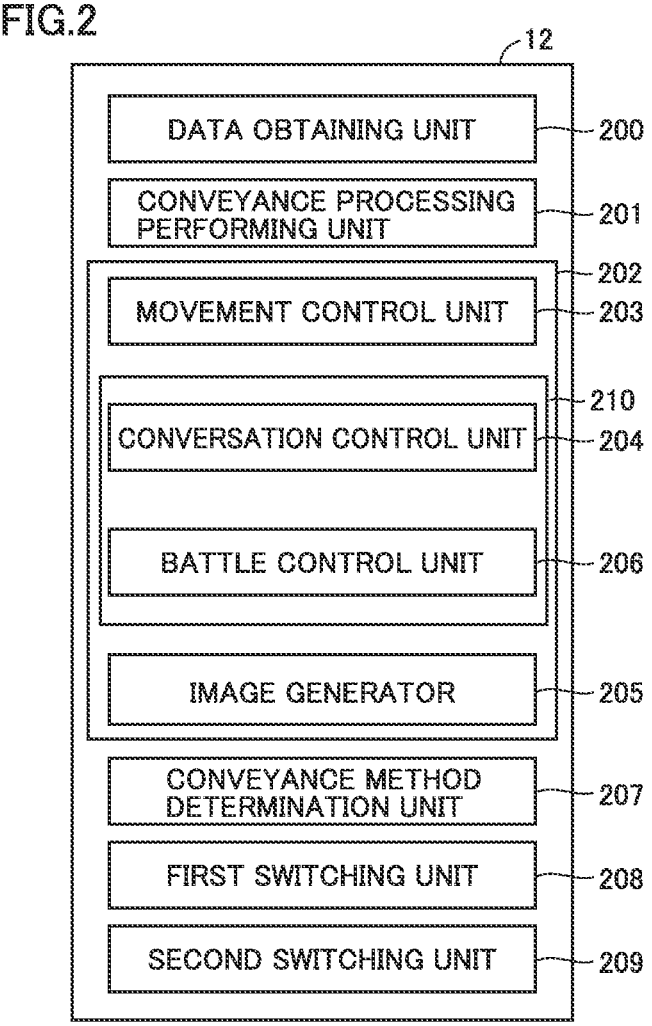
FIG. 2 shows an exemplary illustrative non-limiting drawing illustrating a functional block of an information processing apparatus 10 based on the embodiment.

FIG. 2 is a diagram illustrating a functional block of information processing apparatus 10 based on the embodiment. Referring to FIG. 2, CPU 12 of information processing apparatus 10 implements various functional blocks by reading game program 15.

CPU 12 includes a data obtaining unit 200, a conveyance processing performing unit 201, a game processing performing unit 202, a conveyance method determination unit 207, a first switching unit 208, and a second switching unit 209.

Game processing performing unit 202 includes a movement control unit 203, an event control unit 210, and an image generator 205. Event control unit 210 includes a conversation control unit 204 and a battle control unit 206.

Data obtaining unit 200 obtains data for determining a message to be shown while a game is running Specifically, data obtaining unit 200 obtains from server 30 through network communication unit 16, data for determining a message to be shown while the game is running Data for determining a message may be a code for designating a message stored in advance in game program 15 or information indicating contents of a message, or may be data associated with specific data or non-specific data.

Conveyance processing performing unit 201 performs conveyance processing for generating and providing a first image including a plurality of messages indicating game information of a game based on the data obtained by data obtaining unit 200 such that the plurality of messages are sequentially shown. Specifically, conveyance processing performing unit 201 performs conveyance processing for generating and providing the first image obtained by image pick-up of a virtual space with a second virtual camera fixed at a prescribed position in the virtual space.

After the conveyance processing ends, game processing performing unit 202 performs game processing including movement control processing for moving a player character in the virtual space based on a first operation input (for example, tilting of an analog stick) by a user, event control processing based on a position in the virtual space of the player character, and image generation processing for generating a second image including at least an image based on the first virtual camera that moves together with the player character.

When first switching unit 208 starts game processing, game processing performing unit 202 generates and provides the second image further including a plurality of messages indicating game information of the game based on the obtained data such that the plurality of messages are automatically sequentially shown.

Game processing performing unit 202 may generate and provide the second image further including a plurality of messages indicating game information of the game such that the plurality of messages are automatically sequentially shown in an outer area other than a central area.

When first switching unit 208 starts game processing, game processing performing unit 202 may generate and provide the second image further including a message indicating game information subsequent to game information corresponding to a message conveyed in immediately preceding conveyance processing such that messages are automatically sequentially shown from the subsequent message.

Movement control unit 203 performs movement control processing for moving the player character in the virtual space based on the first operation input by the user. Specifically, movement control unit 203 performs movement control processing for moving the player character arranged in the virtual space based on the operation input by the user through input device 11. Movement control unit 303 performs movement control processing for moving the first virtual camera together with the player character, as following the player character.

Event control unit 210 performs event control processing based on the position in the virtual space of the player character.

Conversation control unit 204 performs conversation event processing which is processing of a conversation event with another character as event control processing based on the position in the virtual space of the player character. Specifically, conversation control unit 204 performs the processing of a conversation event with another character arranged in the virtual space when the player character and another character satisfy prescribed positional relation.

Battle control unit 206 performs battle event processing which is processing of a battle event against another character as event control processing based on the position in the virtual space of the player character. Specifically, battle control unit 206 performs the processing of a battle event against another character when the player character is located at a prescribed position in the virtual space.

Image generator 205 performs image generation processing for generating the second image including at least an image based on the first virtual camera that moves together with the player character.

Conveyance method determination unit 207 determines based on the data obtained by data obtaining unit 200, whether to perform conveyance processing or to perform game processing and generate and provide the second image further including a plurality of messages such that the plurality of messages are automatically sequentially shown.

Conveyance method determination unit 207 determines to perform conveyance processing at the time of start-up of the game, regardless of whether or not the data obtained by data obtaining unit 200 includes specific data.

When the data obtained by data obtaining unit 200 during a period when the game processing is performed other than start-up of the game includes specific data, conveyance method determination unit 207 has conveyance processing performed.

When the data obtained by data obtaining unit 200 while game processing is performed does not include specific data, conveyance method determination unit 207 performs game processing and generates and provides the second image further including a plurality of messages such that the plurality of messages are automatically sequentially shown.

When the second operation input (for example, pressing of a switch button such as pressing of the analog stick by way of example) by the user is provided while the conveyance processing is performed, first switching unit 208 terminates conveyance processing and starts game processing. When the data obtained by data obtaining unit 200 includes specific data and when the second operation input by the user is provided while conveyance processing is performed, first switching unit 208 does not have to terminate conveyance processing.

When the data obtained by data obtaining unit 200 includes specific data and non-specific data, conveyance processing performing unit 201 may perform conveyance processing for generating and providing the first image including a plurality of first messages indicating game information of the game based on the obtained specific data such that the plurality of first messages are sequentially shown, and thereafter may further perform conveyance processing for generating and providing the first image including a plurality of second messages indicating game information of the game based on non-specific data obtained by data obtaining unit 200 such that the plurality of second messages are sequentially shown.

When the second operation input by the user is provided while conveyance processing for generating and providing the first image including the plurality of second messages such that the plurality of second messages are sequentially shown is performed, first switching unit 208 terminates conveyance processing and starts game processing.

When a third operation input (for example, pressing of the switch button such as pressing of the analog stick by way of example) by the user is performed while game processing is performed, second switching unit 209 terminates game processing and starts conveyance processing.

[C. Overview of Game]

A game provided by execution of game program 15 based on the embodiment will now be outlined.

FIG. 3 is a diagram illustrating a configuration of the virtual space of the game based on the embodiment.

Referring to FIG. 3, a plurality of various character objects are arranged in the virtual space.

Specifically, a player character P1 which is controllable by a user through input device 11 and another character P2 which is not controllable by the user through input device 11 are provided. Character P2 may be an object set in advance in game program 15, or may be, for example, a character object created by another user and being freely controllable by another user.

A first virtual camera CM1 is arranged for player character P1. Specifically, first virtual camera CM1 is arranged behind player character P1. First virtual camera CM1 is provided as being movable to follow player character P1. First virtual camera CM1 can pick up an image of the virtual space from a point of view of player character P1 in game processing and the picked-up image of the virtual space can be shown on display 14.

A lobby entrance is provided at a prescribed position in the virtual space as a location where prescribed event processing is to be performed. Player character P1 can move through the virtual space and enter the lobby entrance. When player character P1 enters the lobby entrance, it moves to a lobby which is a not-shown another virtual space. In the lobby, a battle stage BS which is yet another virtual space is selected. The user can select one stage from among a plurality of stages presented as "current battle stages" in the lobby. When the user selects one of the plurality of stages, player character P1 is moved to the virtual space corresponding to the selected stage, and processing of a battle event (player-versus-player game processing) against another character is started. For example, the user may select one stage from among a plurality of stages "DDD", "EEE", and "FFF" presented as battle stage information. Battle stage information may be provided as being changed every prescribed time period in accordance with data transmitted from server 30.

In the present example, a location where game processing is performed and a location where conveyance processing is performed are provided in the same virtual space, and in the present example, a news stage NS is provided at another prescribed position in the virtual space. The location where game processing is performed and the location where conveyance processing is performed may be provided in virtual spaces different from each other.

In news stage NS, a message board MB for showing a message is provided. A second virtual camera CM2 is arranged as being fixed to news stage NS. In conveyance processing, second virtual camera CM2 can pick up, at the fixed position, an image of message board MB provided in news stage NS and the picked-up image of the virtual space including the message shown on message board MB can be shown on display 14. Though an example where message board MB is used for showing a message is described in the present example, an object in any form may be employed so long as a message is shown thereon.

Player character P1 can perform processing of a conversation event with character P2 when it moves through the virtual space to come close to another character P2 and satisfies prescribed positional relation with another character P2.

In the present example, at the time of start-up of the game, the game starts from news stage NS which is the location where conveyance processing is performed. In other words, a plurality of messages indicating game information are shown on message board MB in news stage NS. Second virtual camera CM2 picks up, at the fixed position, an image of message board MB provided in news stage NS and the picked-up image of the virtual space is shown on display 14.

[D. Exemplary Representation of Screen of Game]

An exemplary representation of a screen of the game provided by execution of game program 15 based on the embodiment will now be described. By way of example, the exemplary representation of the screen is provided on display 14 of information processing apparatus 10.

In the present example, processing for conveyance can be modified depending on a type of news. By way of example, two types of news are provided, which are specific news associated with specific data and ordinary news associated with non-specific data.

In the case of the specific news associated with specific data, for reliable conveyance of information to the user, the user is not permitted to perform another operation and only conveyance processing is performed.

In the case of the ordinary news associated with non-specific data, necessary information is conveyed while another operation by the user (an operation of the player character or the like) is permitted during game processing.

Figure 4A:
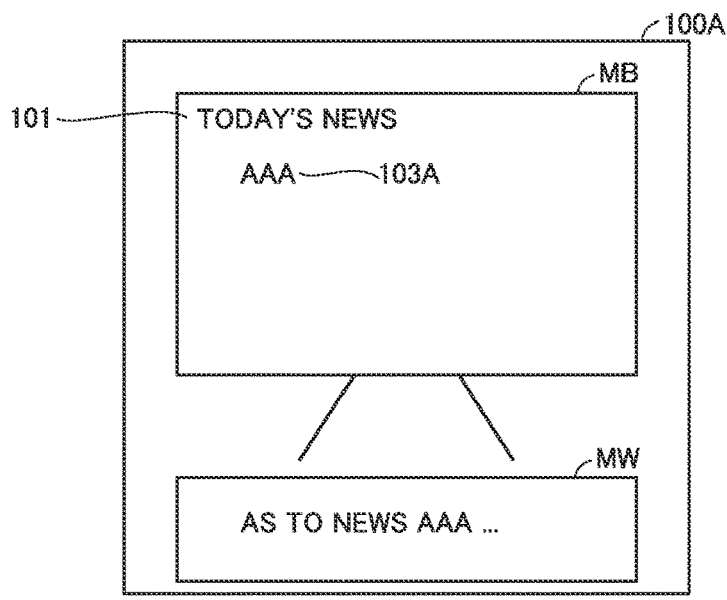
FIGS. 4A to 4C show exemplary illustrative non-limiting drawings illustrating one example of conveyance processing based on the embodiment.
Figure 4B:
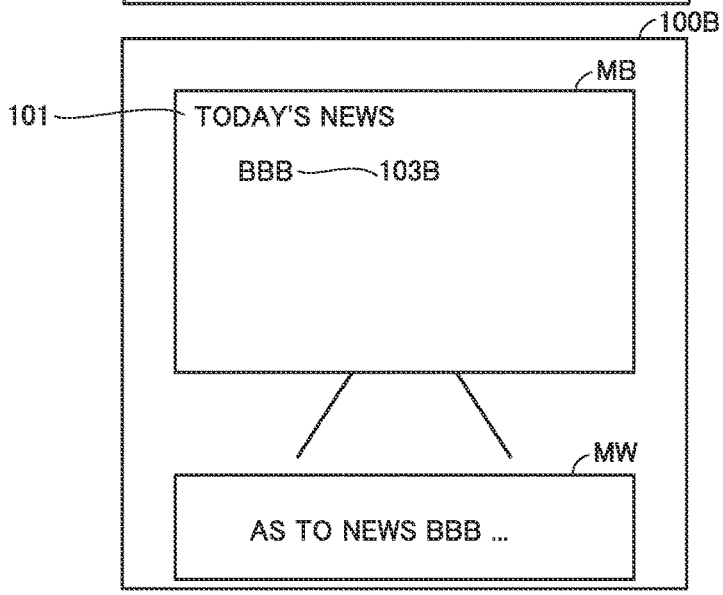
Figure 4C:
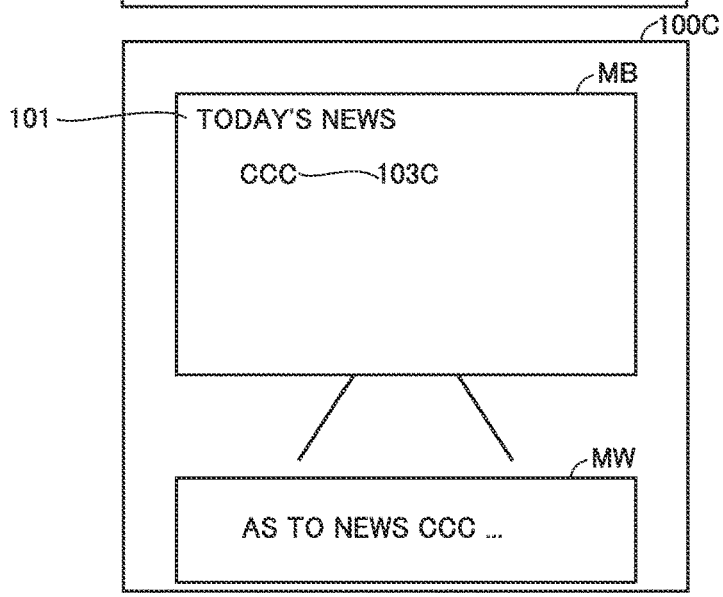

FIGS. 4A to 4C are diagrams illustrating exemplary conveyance processing based on the embodiment.

Referring to FIGS. 4A to 4C, specific news associated with specific data is shown.

Message board MB arranged in news stage NS is shown on screens 100A to 100C.

A message window MW is provided in a lower portion of message board MB.

A plurality of messages indicating game information are sequentially shown on message board MB. In the present example, a plurality of messages are sequentially shown one by one in accordance with a message forwarding operation.

In message window MW, detailed explanations of messages shown on message board MB are sequentially shown in accordance with the message forwarding operation.

In the present example, an example in which representation is switched sequentially in the order of FIG. 4A, FIG. 4B, and FIG. 4C in accordance with the message forwarding operation is shown.

In connection with representation on message board MB, in the case of a message including lines extending beyond a display area of message board MB, the message may sequentially be switched in accordance with the message forwarding operation.

In screen 100A, a title message 101 ("today's news") is shown on message board MB as a news title by way of example of game information. Then, a message 103A ("AAA") is shown as a news topic. In message window MW, "as to news AAA . . . " is shown as detailed explanation of "AAA".

By way of example, when "AAA" is shown as "today's news" on message board MB on screen 100A in FIG. 4A, messages in message window MW are sequentially shown as being switched in accordance with the message forwarding operation, and when the message forwarding operation is performed while the last message about "AAA" is shown, switching to screen 100B in FIG. 4B may be made.

On screen 100B in FIG. 4B, a message 103B ("BBB") is shown as the news topic on message board MB. In message window MW, "as to news BBB . . . " is shown as detailed explanation of "BBB".

On screen 100C in FIG. 4C, a message 103C ("CCC") is shown as the news topic on message board MB. In message window MW, "as to news CCC . . . " is shown as detailed explanation of "CCC".

Messages are thus sequentially shown in accordance with the message forwarding operation.

Full text of a message may be shown in message board MB or message window MW by scrolling in accordance with the message forwarding operation.

The number of messages to be shown may be adjusted in conformity with the display area of message board MB and message window MW. Representation of a prescribed number of messages that were shown in the past in conformity with the display area may be maintained.

Second virtual camera CM2 arranged for news stage NS picks up an image of a plurality of messages indicating game information that are sequentially shown on message board MB, and the picked-up image of the virtual space is shown on display 14.

Thus, in the case of specific news, in conveyance of game information to the user, the information can reliably be conveyed to the user.

Figure 5A:
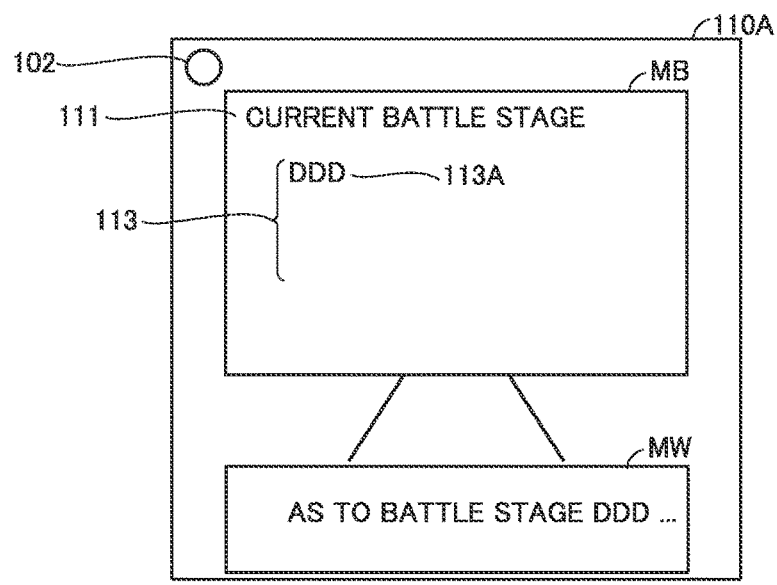
FIGS. 5A to 5C show exemplary illustrative non-limiting drawings illustrating another example of conveyance processing based on the embodiment.
Figure 5B:
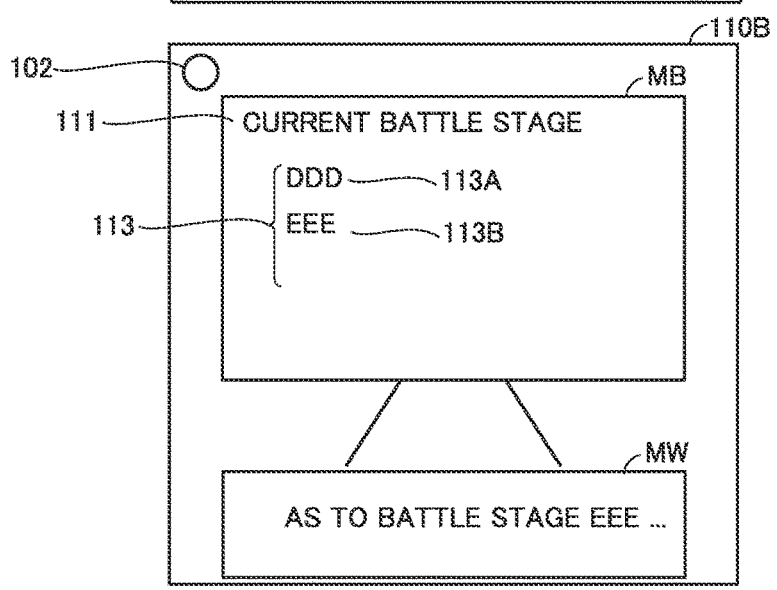
Figure 5C:
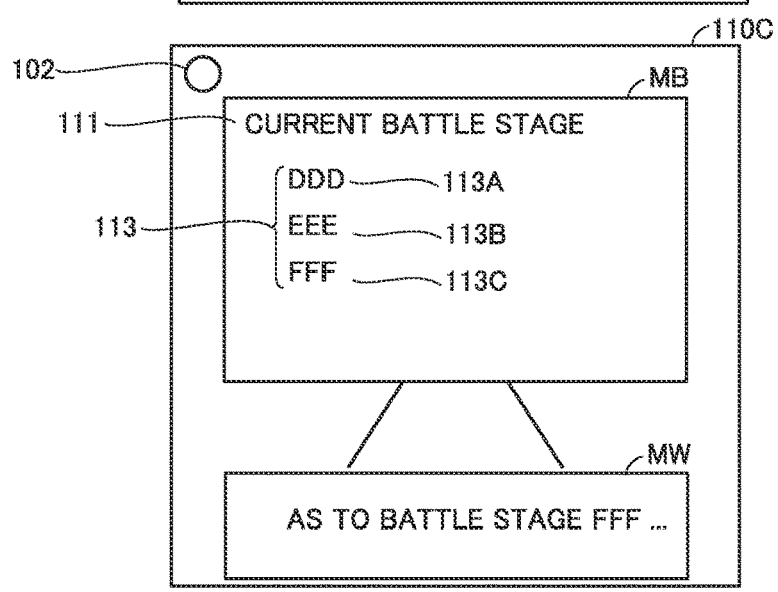

FIGS. 5A to 5C are diagrams illustrating another example of conveyance processing based on the embodiment.

Referring to FIGS. 5A to 5C, ordinary news associated with non-specific data is shown.

Message board MB arranged in news stage NS is shown on screens 110A to 110C.

Message window MW is provided in the lower portion of message board MB.

A plurality of messages indicating game information are sequentially shown on message board MB. In the present example, the plurality of messages are sequentially shown one by one in accordance with the message forwarding operation.

In message window MW, detailed explanations of messages shown on message board MB are sequentially shown in accordance with the message forwarding operation.

In the present example, an example in which representation is switched sequentially in the order of FIG. 5A, FIG. 5B, and FIG. 5C in accordance with the message forwarding operation is shown.

In screen 110A, a title message 111 ("current battle stage") is shown on message board MB by way of example of game information. Then, a message 113A ("DDD"), a message 113B ("EEE"), and a message 113C ("FFF") are sequentially shown as battle stage information 113. In message window MW, "as to battle stage DDD . . . " is shown as detailed explanation of "DDD". "DDD", "EEE", and "FFF" may be names of battle stages, images showing the battle stages, or combination of characters and images.

Battle stage information 113 is information on a stage that can be selected by the user in battle stage BS. By way of example, the user can select in battle stage BS, one stage from among "DDD", "EEE", and "FFF" corresponding to respective messages 113A to 113C shown as battle stage information 113.

As shown in the present example, on message board MB, battle stage information 113 may be shown collectively in one screen. In the present example, detailed explanations of battle stages BS may sequentially be shown in message window MW in accordance with the message forwarding operation. In another example, messages 113A to 113C may initially be shown on message board MB as shown in FIG. 5C. In this case, detailed explanations of "DDD", "EEE", and "FFF" are sequentially shown in message window MW in accordance with the message forwarding operation.

Second virtual camera CM2 arranged for news stage NS picks up an image of the plurality of messages indicating game information that are sequentially shown on message board MB, and the picked-up image of the virtual space is shown on display 14.

On screen 110, separately from representation of the image of news stage NS provided in the virtual space, a button object 102 indicating a state that an operation input onto a switching button by the user can be accepted is provided.

When the operation input onto the switching button by the user is provided while conveyance processing is performed, conveyance processing is terminated and game processing is started.

In the present example, a pressing input onto the analog stick corresponds to the operation input onto the switching button by way of example. Another button to which a similar function is allocated may be pressed as the operation input onto the switching button.

In the present example, by way of example, in the case of the ordinary news, that is, by way of example, until information on the "current battle stage" is shown to the end, the user is allowed to provide the operation input onto the switching button at any timing.

On screen 100 where specific news is shown, another button object indicating that use of the switching button is not permitted may be shown.

In conveyance processing, movement control processing for moving a player character in the virtual space based on the first operation input cannot be performed. In conveyance processing, event control processing based on the position in the virtual space of the player character is not performed.

In the present example, server 30 changes, every prescribed time period, battle stage information which is ordinary news associated with non-specific data and transmits the battle stage information. The user can perform battle event processing (player-versus-player game processing) in the stage changed every prescribed time period.

Figure 6A:
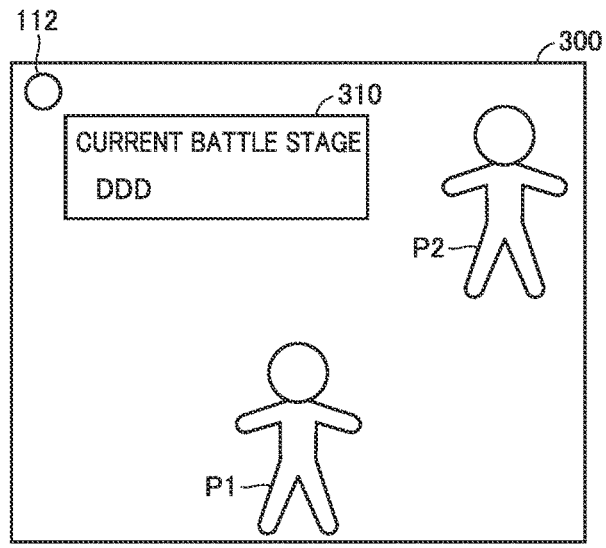
FIGS. 6A to 6C show exemplary illustrative non-limiting drawings illustrating an exemplary screen in game processing based on the embodiment.
Figure 6B:
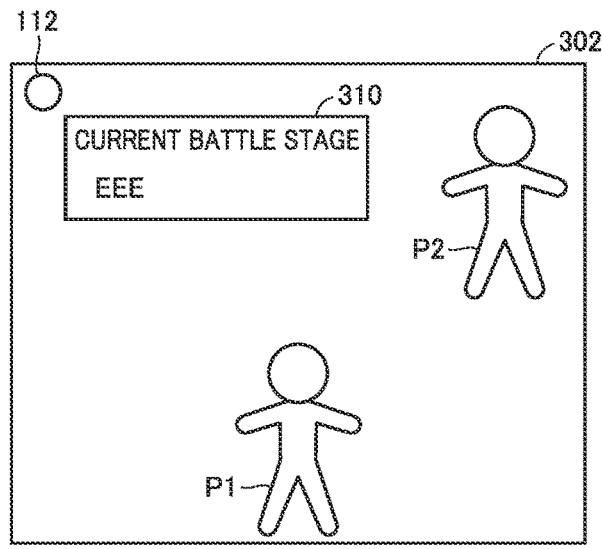
Figure 6C:
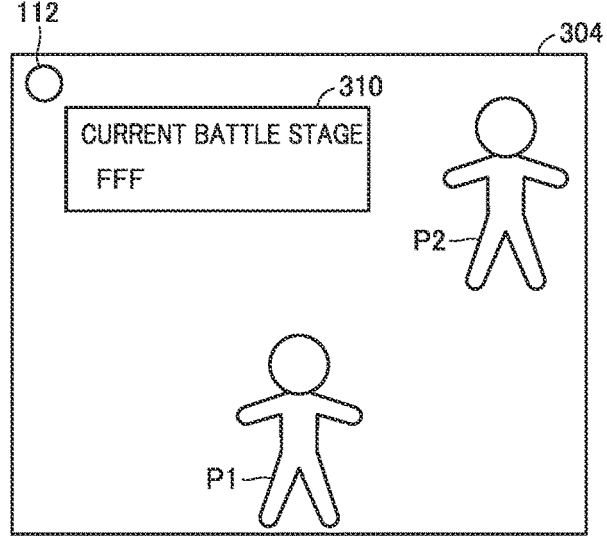

FIGS. 6A to 6C are diagrams illustrating an exemplary screen in game processing based on the embodiment.

Referring to FIG. 6A, on a screen 300, player character P1 and character P2 arranged in the virtual space are shown.

In game processing, first virtual camera CM1 arranged for player character P1 picks up an image of the virtual space from a point of view of player character P1 from behind player character P1 and the picked-up image of the virtual space is shown on display 14.

Player character P1 is provided as being freely controllable by the user through input device 11. By way of example, conversation event processing which is processing of a conversation event with character P2 can be performed as the player character comes closer to character P2. Specifically, conversation control unit 204 performs the conversation event processing when character P2 and player character P1 satisfy prescribed relation of distance. For example, the conversation event processing may be performed in such a manner that information on character P2 (by way of example, information on a name, a label, and a gear of the character) is shown in a form of conversation.

In game processing, a message display area 310 is provided in an outer area (in the present example, an upper area) other than the central area in screen 300. By providing message display area 310 in the outer area (upper area) other than the central area in screen 300, an operation to move player character P1 can be facilitated. Without being limited to the upper area, message display area 310 may be provided at a more appropriate position other than the central area in screen 300.

Message display area 310 is an area where a plurality of messages indicating game information are sequentially shown. When there is no message, no message is shown in message display area 310.

Specifically, by way of example, an example in which the user provides the operation input onto the switching button while ordinary news is shown after specific news in FIGS. 4A to 4C ends is shown.

In the present example, by way of example of game information, title message 111 ("current battle stage") which is a message in ordinary news and message 113A ("DDD") as battle stage information 113 are shown.

In the present example, by way of example, an example in which title message 111 is shown as being fixed and battle stage information 113 is automatically sequentially switched will be described.

Referring to FIG. 6B, on a screen 302, player character P1 and character P2 arranged in the virtual space are shown.

After screen 300 is shown, in message display area 310 on screen 302, title message 111 ("current battle stage") and message 113B ("EEE") as battle stage information 113 are shown.

Screen 302 is a screen automatically shown without an operation to forward characters in the message on screen 300 in FIG. 6A, where message 113A ("DDD") is no longer shown and message 113B (EEE) subsequent thereto is shown.

Referring to FIG. 6C, on a screen 304, player character P1 and character P2 arranged in the virtual space are shown.

After screen 302 is shown, in message display area 310 on screen 304, title message 111 ("current battle stage") and message 113C ("FFF") as battle stage information 113 are shown.

Screen 304 is a screen automatically shown without an operation to forward characters in the message on screen 302 in FIG. 6B, where message 113B ("EEE") is no longer shown and message 113C ("FFF") subsequent thereto is shown. Specifically, after lapse of a period (seconds) in accordance with an amount of a currently shown message, a next message is automatically shown. A next message may be shown after lapse of a fixed period (seconds) rather than a period in accordance with the amount of message.

In the present example, though an example in which messages are automatically sequentially shown one by one is shown, the number of messages may be adjusted in accordance with a size of message display area 310. For example, two messages which are message 113B ("EEE") and message 113C ("FFF") may be shown together by way of example.

"DDD", "EEE", and "FFF" may be names of battle stages, images showing the battle stages, or combination of characters and images.

Not only the names ("DDD", "EEE", and "FFF") of the battle stages but also detailed explanation of each stage shown in message window MW may be shown in message display area 310. By way of example, message window MW is also shown beside the image showing battle stage "DDD". "As to battle stage DDD . . . " may automatically sequentially be shown as detailed explanation of the battle stage "DDD". As representation of the detailed message on the battle stage "DDD" ends, automatic switching to representation of the image showing battle stage "EEE" and the message showing detailed explanation on the battle stage "EEE" may be made.

When the operation input onto the switching button is provided while the message on the battle stage "DDD" is shown in the conveyance processing described with reference to FIG. 5A, representation may be started from the message on the battle stage "EEE" as shown in screen 302 in FIG. 6B.

When the operation input onto the switching button is provided in the middle of messages on the battle stage "DDD" shown in message window MW (before representation of the last message) in the conveyance processing described with reference to FIG. 5A, instead of start of representation from the message on the battle stage "EEE" shown in screen 302 in FIG. 6B, representation may start from a message that should have been shown next in message window MW.

On screen 300, separately from representation of the image of the virtual space, a button object 112 indicating a state that an operation input onto the switching button by the user can be accepted is provided.

When the operation input onto the switching button by the user is provided while game processing is performed, game processing is terminated and conveyance processing is started. In the present example, conveyance processing in news stage NS in the virtual space is started.

In the present example, a pressing input onto the analog stick corresponds to the operation input onto the switching button by way of example. Another button to which a similar function is allocated may be pressed as the operation input onto the switching button.

[E. Exemplary Data Table]

FIGS. 7A and 7B are diagrams illustrating a data table of a message based on the embodiment.

Referring to FIG. 7A, by way of example, a data table of a message received from server 30 by information processing apparatus 10 at the time of start-up of information processing apparatus 10 is shown. Data obtaining unit 200 obtains from server 30 through network communication unit 16, data for determining a message to be shown while a game is running Data obtaining unit 200 generates a data table and has the data table stored in main memory 18. Data obtaining unit 200 performs sort processing for prioritizing a message associated with specific data (a priority flag ("1")) over a message associated with non-specific data (without the priority flag).

In the present example, by way of example, an example in which data for determining a plurality of messages is received from server 30 at the time of start-up of a game in information processing apparatus 10 is shown.

Specifically, an example in which messages MS1 to MS8 (which will collectively also be referred to as a message MS below) are received is shown. By way of example, messages MS1 to MS8 are codes for designating messages stored in advance in game program 15.

The priority flag ("1") representing specific data and without the priority flag representing non-specific data are registered in the data table in association with message MS.

The specific data (priority flag ("1")) or the non-specific data (without the priority flag) is transmitted from server 30 to information processing apparatus 10, as data for determining a message, together with the code.

For example, by way of example, in FIGS. 4A to 4C, message MS1 corresponds to "today's news." Message MS2 corresponds to "AAA". Message MS3 corresponds to "BBB". Message MS4 corresponds to "CCC". By way of example, in FIGS. 5A to 5C, message MS5 corresponds to the "current battle stage." Message MS6 corresponds to "DDD". Message MS7 corresponds to "EEE". A message MS8 corresponds to "FFF".

The data table is provided with a completion flag indicating that a corresponding message has been conveyed to a user. In an initial state, nothing is registered in an item of the completion flag ("1"), and the completion flag ("1") is registered when a message is conveyed to the user (shown on the message board or the like).

Conveyance method determination unit 207 determines to perform conveyance processing at the time of start-up of a game, regardless of whether or not data for determining a message included in the data table includes specific data.

Conveyance processing performing unit 201 performs conveyance processing in such a manner as extracting messages successively one by one from the data table and sequentially showing the messages on message board MB. Specifically, conveyance processing performing unit 201 identifies the code (message MS1) registered, for example, in a field of the message from the top in the data table and obtains specific message contents ("today's news") corresponding to the code (message MS1) from game program 15. This processing is successively performed.

When conveyance processing performing unit 201 performs conveyance processing for one message, it registers the completion flag ("1") for the corresponding message.

Conveyance processing performing unit 201 performs conveyance processing such that, based on the data table subjected to sort processing, messages associated with specific data (priority flag ("1")) are sequentially shown and thereafter messages associated with non-specific data (without the priority flag) are sequentially shown.

Specifically, after the conveyance processing described with reference to FIGS. 4A to 4C, conveyance processing described with reference to FIGS. 5A to 5C is performed by way of example.

Referring to FIG. 7B, by way of example, a data table of a message received from server 30 by information processing apparatus 10 while the game processing is performed is shown. Data obtaining unit 200 obtains from server 30 through network communication unit 16, data for determining a message to be shown while a game is running Data obtaining unit 200 generates the data table and has the data table stored in main memory 18.

In the present example, by way of example, an example in which data for determining a plurality of messages is received from server 30 while game processing is performed in information processing apparatus 10 is shown.

Specifically, an example in which messages MS11 to MS14 . . . are received is shown. By way of example, messages MS11 to MS14 are codes for designating messages stored in advance in game program 15.

For example, by way of example, an example in which battle stage information which is ordinary news associated with non-specific data is transmitted will be described.

Messages MS11 to MS14 are registered in association with non-specific data (without the priority flag).

By way of example, message MS11 corresponds to the "current battle stage." Message MS12 corresponds to "GGG". Message MS13 corresponds to "HHH". Message MS14 corresponds to "III". By way of example, the user can select in battle stage BS, one stage from among "GGG", "HHH", and "III" shown as the battle stage information.

When the data that determines messages included in the data table during a period when game processing is performed other than start-up of the game includes specific data, conveyance method determination unit 207 determines to perform conveyance processing. When the data that determines messages included in the data table during the period when game processing is performed other than start-up of the game does not include the specific data, conveyance method determination unit 207 performs game processing and generates and provides a second image further including a plurality of messages such that the plurality of messages are automatically sequentially shown.

In this case, conveyance processing is not performed. In the game processing, when image generator 205 checks the data table and there is a message which has not yet been conveyed, image generator 205 performs processing for extracting messages successively one by one from the data table, generating a message image, and sequentially showing the images in message display area 310.

When image generator 205 performs processing for generating message images and sequentially showing the images in message display area 310, it registers the completion flag ("1") of the corresponding message.

Specifically, messages MS11 to MS14 are automatically sequentially shown in message display area 310 as described with reference to FIGS. 6A and 6B.

When the game ends, the completion flag in the data table is reset. The completion flag for data associated with specific data (priority flag "1") in the data table may not be reset.

[F. Processing Procedure in Information Processing]

A processing procedure in information processing provided by execution of game program 15 based on the embodiment will now be described. Each step is performed by execution of game program 15 by CPU 12.

Figure 8:
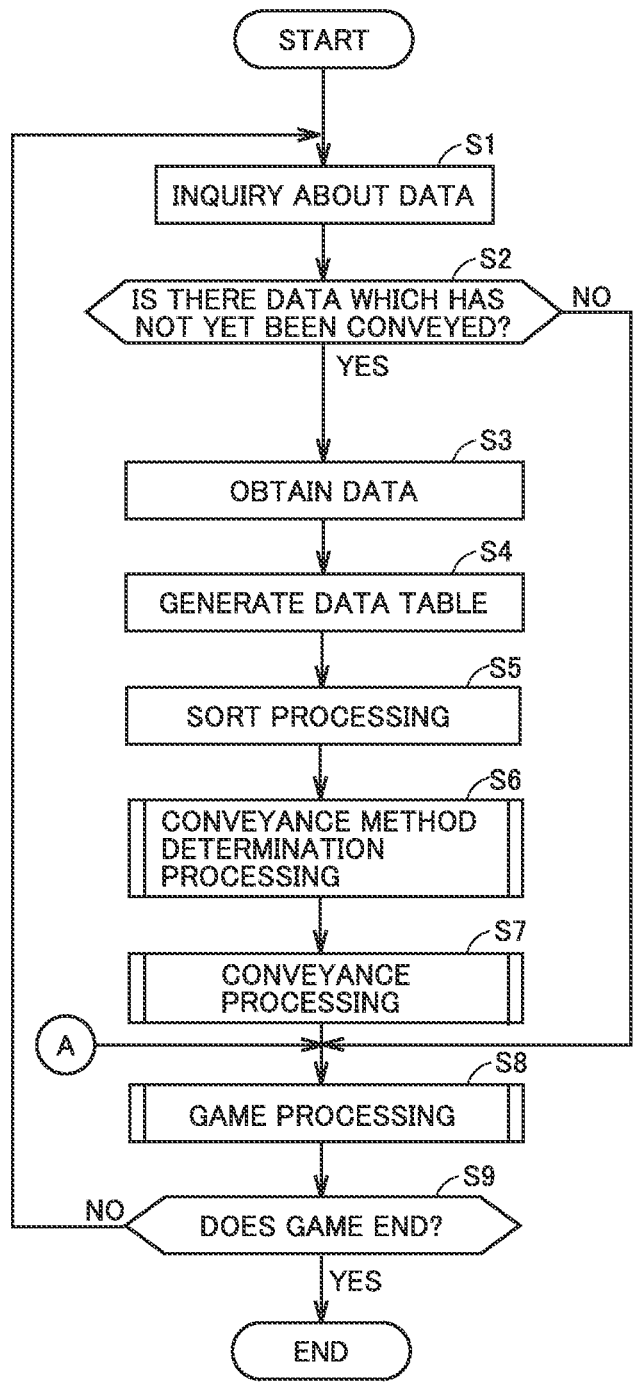
FIG. 8 shows an exemplary illustrative non-limiting flowchart illustrating information processing provided by a game program 15 based on the embodiment.

FIG. 8 is a flowchart illustrating information processing provided by game program 15 based on the embodiment.

Referring to FIG. 8, when CPU 12 starts up game program 15, data obtaining unit 200 inquires of server 30 about data (step S1). CPU 12 inquires of server 30 through network communication unit 16 about data for determining a message to be shown while a game is running.

Data obtaining unit 200 then determines whether or not there is data which has not yet been conveyed to the user (step S2).

In step S2, when data obtaining unit 200 determines that there is data which has not yet been conveyed to the user (YES in step S2), the process proceeds to step S3.

When data obtaining unit 200 determines in step S2 that there is no such data (NO in step S2), the process proceeds to step S8.

In step S3, data obtaining unit 200 obtains from server 30 through network communication unit 16, data for determining a message to be shown while the game is running.

Data obtaining unit 200 then generates the data table (step S4). Specifically, data obtaining unit 200 generates the data table described with reference to FIGS. 7A and 7B based on the obtained data and has the data table stored in main memory 18.

Data obtaining unit 200 then performs sort processing for the data table (step S5). Data obtaining unit 200 performs sort processing for sorting messages associated with specific data (priority flag ("1")) and messages associated with non-specific data (without the priority flag), for data for determining the message included in the data table. Data obtaining unit 200 performs sort processing for prioritizing messages associated with specific data (priority flag ("1")) over messages associated with non-specific data (without the priority flag). Conveyance processing performing unit 201 can thus perform conveyance processing such that the messages associated with specific data (priority flag ("1")) are sequentially shown and thereafter messages associated with non-specific data (without the priority flag) are sequentially shown.

Since specific news associated with specific data and ordinary news associated with non-specific data are thus each collectively shown, conveyance processing can efficiently be performed and the user can efficiently perform operations.

Conveyance method determination unit 207 then performs conveyance method determination processing for determining, based on the data obtained by data obtaining unit 200, whether to perform conveyance processing or to perform game processing and generate and provide the second image further including a plurality of messages such that the plurality of messages are automatically sequentially shown (step S6). Details of the conveyance method determination processing will be described later.

Conveyance processing performing unit 201 then performs conveyance processing for generating and providing the first image including a plurality of messages indicating game information of the game based on the data obtained by data obtaining unit 200 such that the plurality of messages are sequentially shown (step S7). Details of the conveyance processing will be described later.

After the conveyance processing in step S7 ends, game processing performing unit 202 then performs game processing including movement control processing for moving the player character in the virtual space based on the first operation input by the user, event control processing based on the position in the virtual space of the player character, and image generation processing for generating the second image including at least an image based on the first virtual camera that moves together with the player character (step S8).

CPU 12 then determines whether or not game processing ends (step S9).

When CPU 12 determines in step S9 that the game processing ends (YES in step S9), the process ends.

When CPU 12 determines that the game processing does not end (NO in step S9), the process returns to step S1 and the processing above is repeated.

Figure 9:
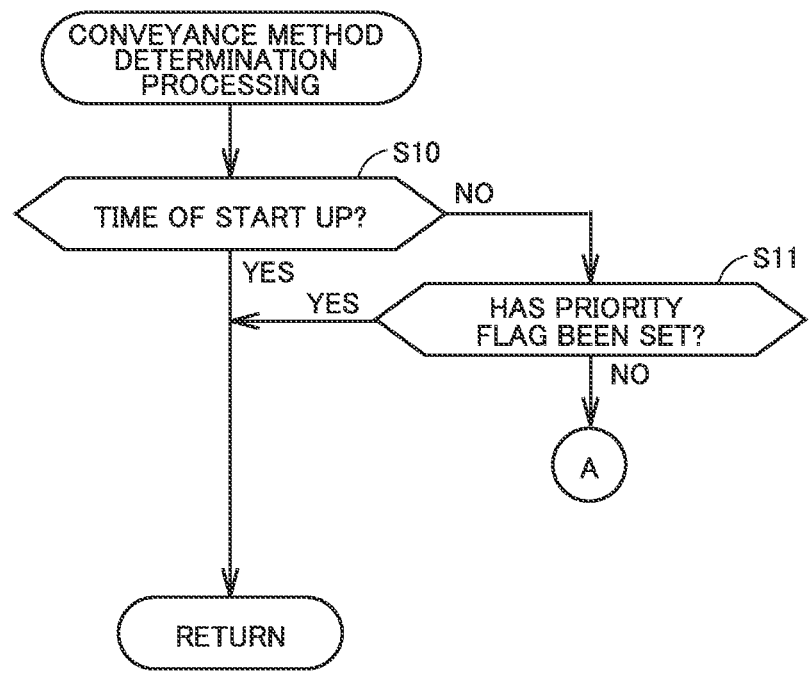
FIG. 9 shows an exemplary illustrative non-limiting flowchart illustrating processing by a conveyance method determination unit 207 based on the embodiment.

FIG. 9 is a flowchart illustrating processing by conveyance method determination unit 207 based on the embodiment.

Referring to FIG. 9, conveyance method determination unit 207 determines whether or not processing is processing at the time of start-up of the game (step S10).

When conveyance method determination unit 207 determines in step S10 that processing is processing at the time of start-up of the game (YES in step S10), the process ends (return). The process then proceeds to conveyance processing in step S7 in FIG. 8.

Conveyance method determination unit 207 determines to perform conveyance processing at the time of start-up of the game regardless of whether or not the obtained data includes specific data.

When conveyance method determination unit 207 determines in step S10 that processing is not processing at the time of start-up of the game (NO in step S10), it refers to the data table and determines whether or not there is a priority flag associated with a message (step S11). Conveyance method determination unit 207 refers to the data table stored in main memory 18 and determines whether or not there is message MS associated with the priority flag ("1").

When conveyance method determination unit 207 refers to the data table and determines in step S11 that the priority flag has been set (YES in step S11), the process ends (return). The process then proceeds to conveyance processing in step S7 in FIG. 8.

When conveyance method determination unit 207 refers to the data table and determines that the specific data (priority flag ("1")) is included, it determines to perform conveyance processing.

When conveyance method determination unit 207 refers to the data table and determines in step S11 that no priority flag has been set (NO in step S11), the process proceeds to "A".

In this case, the conveyance processing in step S7 in FIG. 8 is skipped and the process proceeds to game processing in step S8.

Figure 10:
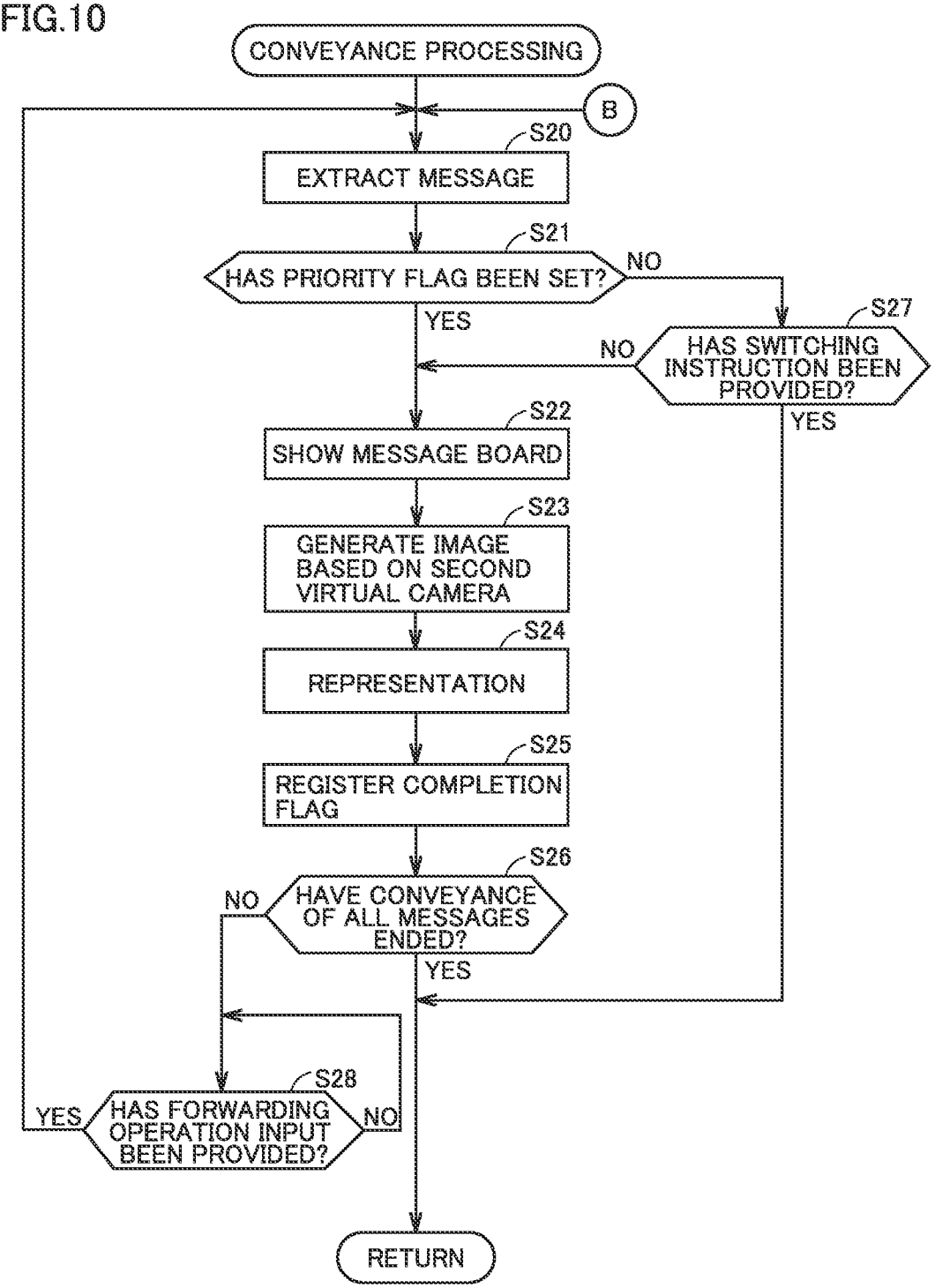
FIG. 10 shows an exemplary illustrative non-limiting flowchart illustrating conveyance processing by a conveyance processing performing unit 201 based on the embodiment.

FIG. 10 is a flowchart illustrating conveyance processing by conveyance processing performing unit 201 based on the embodiment.

Referring to FIG. 10, conveyance processing performing unit 201 refers to the data table and extracts a message (step S20). Specifically, conveyance processing performing unit 201 refers to the data table and extracts messages sequentially from the top. In this regard, conveyance processing performing unit 201 refers to the data table and extracts sequentially from the top, messages for which the completion flag ("1") has not been registered.

Conveyance processing performing unit 201 determines whether or not there is a priority flag corresponding to the message (step S21).

When conveyance processing performing unit 201 determines in step S21 that the priority flag has been set (YES in step S21), it has the message shown on message board MB (step S22).

Conveyance processing performing unit 201 then generates an image based on the second virtual camera (step S23). In conveyance processing, second virtual camera CM2 picks up at the fixed position, an image of message board MB provided in news stage NS and generates the picked-up image of the virtual space including the message shown on message board MB.

Conveyance processing performing unit 201 then has the generated image shown on display 14 (step S24). Specifically, a screen in the conveyance processing described with reference to FIGS. 4A to 4C and 5A to 5C is shown.

Conveyance processing performing unit 201 then registers the completion flag in the data table (step S25). Specifically, conveyance processing performing unit 201 registers the completion flag ("1") in correspondence with the message in the data table.

Conveyance processing performing unit 201 then determines whether or not conveyance of all messages has ended (step S26). Specifically, conveyance processing performing unit 201 determines whether or not the completion flag ("1") has been registered in correspondence with all messages in the data table.

When conveyance processing performing unit 201 determines that conveyance of all messages has ended (YES in step S26), the process ends (return).

The process then proceeds to game processing in next step S8.

When conveyance processing performing unit 201 determines that conveyance of all messages has not ended (NO in step S26), it determines whether or not a message forwarding operation input (pressing input onto a prescribed button) has been provided (step S28).

When conveyance processing performing unit 201 determines in step S28 that the message forwarding operation input (pressing input onto the prescribed button) has not been provided (NO in step S28), it maintains the state in step S28.

When conveyance processing performing unit 201 determines in step S28 that the message forwarding operation input (pressing input onto the prescribed button) has been provided (YES in step S28), the process returns to step S20 and the processing above is repeated.

When conveyance processing performing unit 201 determines in step S21 that no priority flag has been set (NO in step S21), it determines whether or not a switching instruction has been provided (step S27). Specifically, conveyance processing performing unit 201 determines whether or not an operation input onto the switching button (by way of example, a pressing input onto the analog stick) by the user has been provided while conveyance processing is performed.

When conveyance processing performing unit 201 determines in step S27 that the switching instruction has been provided (YES in step S27), it terminates the conveyance processing (return). Then, the process proceeds to game processing in next step S8. Specifically, when conveyance processing performing unit 201 determines that the operation input onto the switching button has been provided, it instructs first switching unit 208 to terminate conveyance processing and start game processing.

Through the processing, when the operation input onto the switching button has been provided, conveyance processing can be terminated and game processing can be performed. Therefore, expectation of the user who desires to operate the player character in the game as early as possible can be met.

When conveyance processing performing unit 201 determines in step S27 that the switching instruction has not been provided (NO in step S27), the process proceeds to step S22 and the conveyance processing continues.

Figure 11:
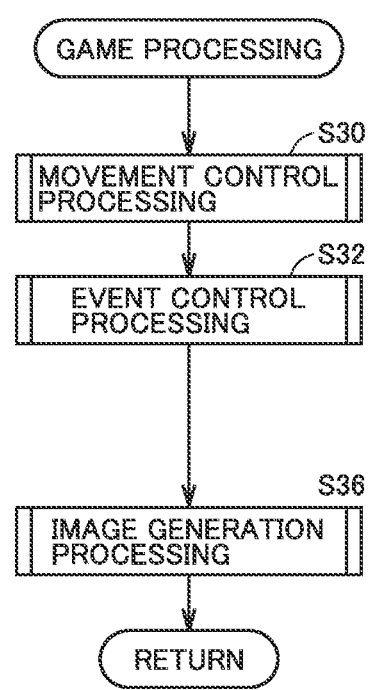
FIG. 11 shows an exemplary illustrative non-limiting flowchart illustrating game processing by a game processing performing unit 202 based on the embodiment.

FIG. 11 is a flowchart illustrating game processing by game processing performing unit 202 based on the embodiment.

Referring to FIG. 11, game processing performing unit 202 performs movement control processing for moving the player character in the virtual space based on the first operation input by the user (step S30). Details of the movement control processing will be described later.

Game processing performing unit 202 then performs event control processing based on the position in the virtual space of the player character (step S32). Details of the event control processing will be described later.

Game processing performing unit 202 then performs image generation processing for generating the second image including at least the image based on the first virtual camera that moves together with the player character (step S36). Details of the image generation processing will be described later.

Then, the process ends (return).

Figure 12:
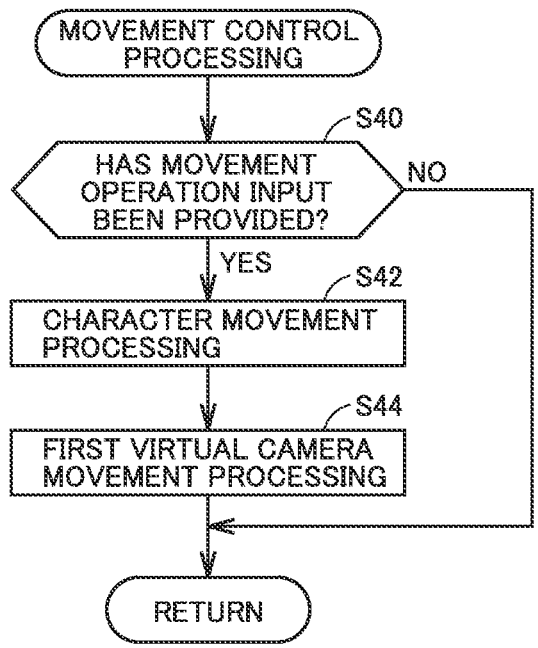
FIG. 12 shows an exemplary illustrative non-limiting flowchart illustrating movement control processing by a movement control unit 203 based on the embodiment.

FIG. 12 is a flowchart illustrating movement control processing by movement control unit 203 based on the embodiment.

Referring to FIG. 12, movement control unit 203 determines whether or not a movement operation input has been provided through input device 11 (step S40).

When movement control unit 203 determines in step S40 that the movement operation input has been provided through input device 11 (YES in step S40), it performs processing for moving the player character (step S42). Movement control unit 203 moves player character P1 to any position in accordance with the movement operation input in the virtual space.

Movement control unit 203 then performs processing for moving the first virtual camera (step S44). Movement control unit 203 moves first virtual camera CM1 as following player character P1 in the virtual space.

Then, the process ends (return).

When movement control unit 203 determines in step S40 that the movement operation input has not been provided through input device 11 (NO in step S40), the process ends (return).

Figure 13:
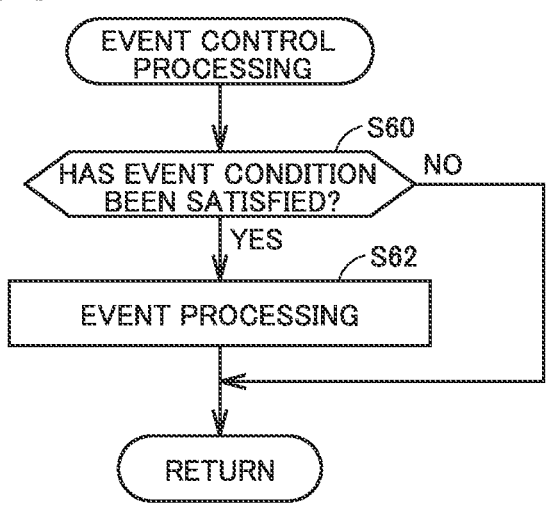
FIG. 13 shows an exemplary illustrative non-limiting flowchart illustrating event control processing by an event control unit 210 based on the embodiment.

FIG. 13 is a flowchart illustrating event control processing by event control unit 210 based on the embodiment.

Referring to FIG. 13, event control unit 210 determines whether or not an event condition has been satisfied (step S60).

When event control unit 210 determines in step S60 that the event condition has been satisfied (YES in step S60), it performs event processing (step S62).

Specifically, conversation control unit 204 performs processing of a conversation event with another character as event control processing based on the position in the virtual space of the player character. When the player character and another character arranged in the virtual space satisfy prescribed positional relation (the event condition is satisfied), conversation control unit 204 executes the conversation event with another character.

Battle control unit 206 performs processing of a battle event against another character as event control processing based on the position in the virtual space of the player character. Specifically, when the player character is located at a prescribed position (in battle stage BS) in the virtual space (the event condition is satisfied), battle control unit 206 performs processing of the battle against another character.

Then, the process ends (return).

Figure 14:
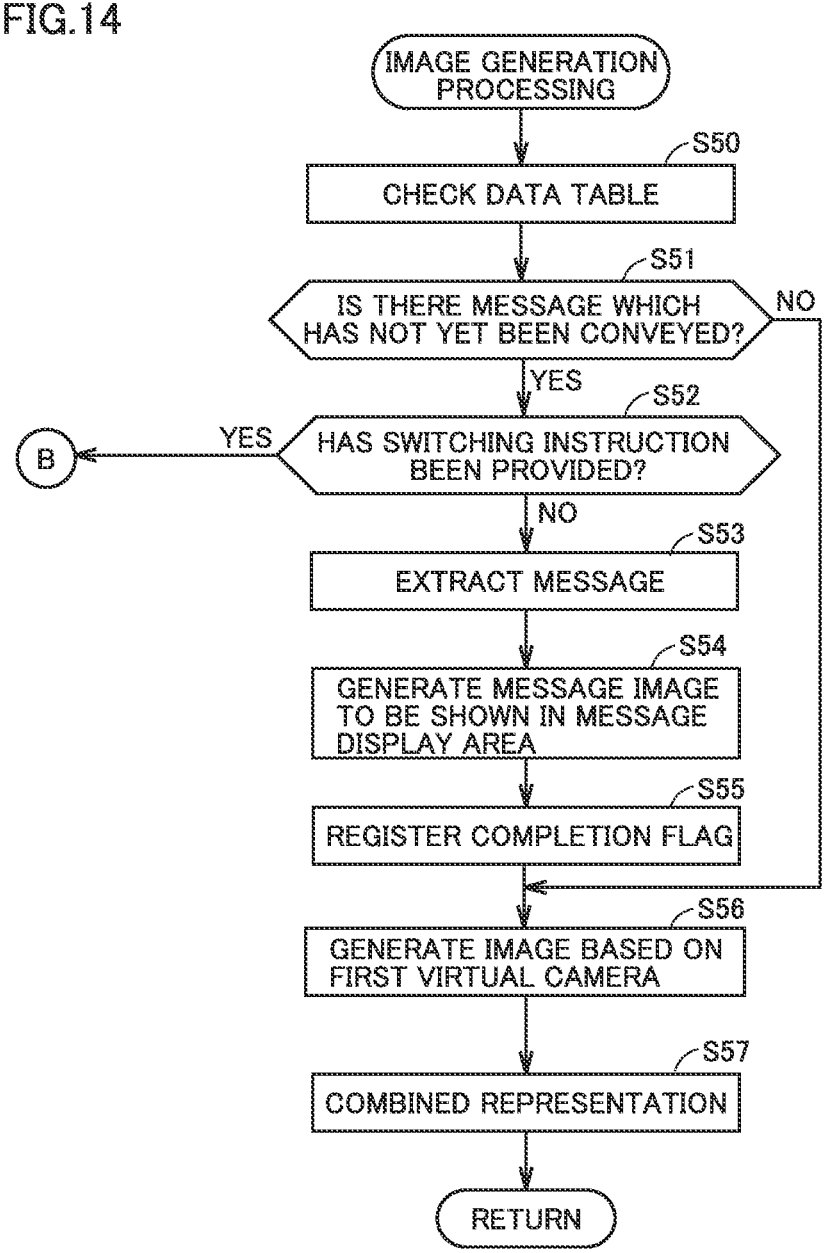
FIG. 14 shows an exemplary illustrative non-limiting flowchart illustrating image generation processing by an image generator 205 based on the embodiment.

FIG. 14 is a flowchart illustrating image generation processing by image generator 205 based on the embodiment.

Referring to FIG. 14, image generator 205 checks the data table (step S50).

Image generator 205 then determines whether or not there is a message which has not yet been conveyed (step S51). Image generator 205 determines whether or not there is a message for which the completion flag ("1") has not been registered in the data table.

When image generator 205 determines in step S51 that there is a message which has not yet been conveyed (step S51), it determines whether or not the switching instruction has been provided (step S52). Image generator 205 determines whether or not the operation input onto the switching button (by way of example, the pressing input onto the analog stick) has been provided.

When image generator 205 determines in step S52 that the switching instruction has not been provided (NO in step S52), it extracts messages from the data table (step S53). When image generator 205 determines that the operation input onto the switching button has not been provided, it refers to the data table and extracts messages for which the completion flag ("1") has not been registered successively from the top.

Image generator 205 then generates a message image to be shown in message display area 310 (step S54).

Image generator 205 then registers the completion flag ("1") (step S55). Specifically, image generator 205 registers the completion flag ("1") in correspondence with the message in the data table.

Image generator 205 then generates the image based on the first virtual camera (step S56). First virtual camera CM1 picks up an image of the virtual space from the point of view of player character P1 from behind player character P1 and generates the picked-up image of the virtual space.

Image generator 205 then combines images and has the combined image shown on display 14 (step S57). Image generator 205 combines the message image shown in message display area 310 and the image of the virtual space with each other and has the combined image shown on display 14. Image generator 205 holds the generated message image until lapse of a period (seconds) in accordance with an amount of the message, combines the message image with the image of the virtual space, and has the combined image shown on display 14. The generated message image may be held for a fixed period (seconds) rather than a period in accordance with an amount of the message and combined with the image of the virtual space, and the resultant image may be shown on display 14.

Then, the process ends (return).

Even when the conveyance processing as such is terminated and the game processing is performed, a message can be shown in message display area 310. Therefore, game information can appropriately be conveyed while the operation of the player character in the game is permitted. In other words, the user can turn his/her attention to game processing while the user appropriately obtains the game information.

When image generator 205 determines in step S51 that there is no message which has not yet been conveyed (NO in step S51), steps S52 to S55 are skipped and the process proceeds to step S56. Subsequent processing is similar.

When image generator 205 determines in step S52 that the switching instruction has been provided (YES in step S52), the process proceeds to B. Specifically, the process proceeds to step S20 where conveyance processing is performed.

When image generator 205 determines that the operation input onto the switching button (by way of example, the pressing input onto the analog stick) has been provided, it instructs second switching unit 209 to terminate the game processing and start the conveyance processing.

Through the processing, when checking of the game information on message board MB is desired, the game information can be checked in the conveyance processing and hence information can be conveyed in accordance with the user's intention.

When the conveyance processing is terminated and the game processing is performed, that is, when first switching unit 208 starts the game processing, a message which has not yet been conveyed is checked and messages that have not yet been conveyed are automatically sequentially shown in message display area 310. In other words, the second image further including a message indicating game information subsequent to game information corresponding to a message conveyed in immediately preceding conveyance processing is generated and provided such that messages are automatically sequentially shown from the subsequent message. Therefore, there is no need to repeatedly check the same information, and conveyance using message display area 310 can be terminated early.

[G. Additional Aspects]

Though an example in which a plurality of messages indicating game information of a game are sequentially shown on message board MB in conveyance processing is described above, a message may be conveyed by further using a character. For example, a character who reads, adjacent to message board MB, a plurality of messages indicating game information may be provided. The character may explain contents shown in message board MB by talking about them or by talking about additional information different from the contents.

Though an example in which messages are automatically sequentially shown in message display area 310 is described above, the messages may sequentially be shown in message display area 310, for example, in accordance with the operation input onto input device 11, instead of automatic representation.

Messages may also automatically sequentially be shown on message board MB also in conveyance processing.

Messages indicating game information may include not only names of stages but also information on the stages and conversations specific to a character that conveys the messages. The messages may include an image of a landscape of the stage.

An example in which the same message contents are shown as ordinary news, by way of example, for what is conveyed in the conveyance processing described with reference to FIGS. 5A to 5C and what is conveyed with the use of message display area 310 described with reference to FIGS. 6A and 6B is described above. Without being limited to the example where the contents are the same, message contents may be different. For example, a message table for conveyance processing for designating a message in correspondence with a code and a message table for the message display area may be provided, and contents may be different even when a code corresponding to the message is the same. Information can appropriately be conveyed to the user by making adjustment as appropriate for addressing a difference in size of the display area.

Though an example in which server 30 transmits a code that designates a message and specific data or non-specific data to information processing apparatus 10 as data for determining a message to be shown while a game is running is described above by way of example, specific data or non-specific data does not have to be transmitted. Specifically, server 30 may transmit to information processing apparatus a code that designates a message as data for determining a message to be shown while the game is running by way of example, and in that case, data obtaining unit 200 may register the code in the data table in association with non-specific data. Server 30 may transmit to information processing apparatus 10, information indicating contents of a message other than the code that designates the message, as data for determining a message to be shown while the game is running by way of example, and when information other than the code is transmitted, data obtaining unit 200 may register the information in the data table in association with specific data.

Though an example in which first virtual camera CM1 and second virtual camera CM2 are arranged in the virtual space separately from each other is described above, only a single virtual camera may be arranged. Specifically, in conveyance processing, first virtual camera CM1 may move to a position where second virtual camera CM2 is arranged in a fixed manner, and in game processing, first virtual camera CM1 may be arranged behind player character P1.

When player character P1 moves to another virtual space, the operation input onto the switching button (by way of example, the pressing input onto the analog stick) may not be accepted. For example, when player character P1 moves to battle stage BS, it has moved to another virtual space and the user may be concentrating to game processing (battle event processing). Therefore, switching to conveyance processing may be deactivated. Deactivation of switching to the conveyance processing in the case of movement from another virtual space not in an identical virtual space can also avoid the possibility of uncomfortable feeling in terms of consistency between images.

Though an example in which a plurality of messages indicating game information are automatically sequentially shown in message display area 310 is described above, such sequential representation may be suspended when a prescribed operation is performed through input device 11. When an operation to open a menu screen is performed by way of example, motion in the virtual space including player character P1 may be stopped, the menu screen may be shown as being superimposed, and representation in message display area 310 may be stopped.

In processing for conveying ordinary news by way of example, in representation of a first title message, the operation input onto the switching button may not be accepted. By reliably conveying the title message, the user will be able to understand importance of information.

Though an example in which data obtaining unit 200 inquires of server 30 about data for determining a message to be shown while a game is running and polling-type communication for obtaining the data is established is described above by way of example, push-type communication in which server 30 actively transmits to information processing apparatus 10, data for determining a message to be shown while a game is running may be established.

Data itself obtained from server 30 may include a message. Specifically, data may include a message including such contents as an additional stage or weapon and various types of update information in association with specific data.

Though an example in which conveyance method determination unit 207 performs conveyance processing at the time of start-up of a game in step S10 in FIG. 9 is described above, it may perform only processing in step S11. In other words, when data is not associated with specific data, the process may proceed to game processing rather than conveyance processing.

When data associated with non-specific data which has not yet been conveyed is obtained during game processing, only a simplified message ("the stage has changed") may be shown.

Though an example in which ordinary news is conveyed following specific news is described above, specific news may be conveyed following ordinary news. The ordinary news and the specific news may be conveyed as being mixed. Specifically, sort processing in step S5 in FIG. 8 does not have to be performed.

Though an example in which, when first switching unit 208 starts game processing, a second image further including a message indicating game information subsequent to game information corresponding to a message conveyed in immediately preceding conveyance processing is generated and provided such that messages are automatically sequentially shown from the subsequent message is described above, messages may automatically sequentially be shown from the message conveyed in the immediately preceding conveyance processing.

Though a configuration in which first virtual camera CM1 is arranged behind player character P1 at a position where it shoots player character P1 is described above, the first virtual camera may be arranged at a position on the line of sight of player character P1 (what is called a subjective view).

In conveyance processing, a message may be shown simply by a two-dimensional image.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A non-transitory storage medium encoded with a computer readable program executed by a computer of a game device, at least one computer being configured to perform operations comprising:
   obtaining data for determining a message to be shown while a game is running;
   performing conveyance processing for generating and providing a first image including a plurality of messages indicating game information of the game based on the obtained data such that the plurality of messages are sequentially shown;
   performing game processing after the conveyance processing ends, the game processing including movement control processing for moving a player character in a virtual space based on a first operation input by a user, first control processing based on a position in the virtual space of the player character, and image generation processing for generating a second image including at least an image based on a first virtual camera that moves together with the player character;
   terminating the conveyance processing and starting the game processing when a second operation input by the user is provided while the conveyance processing is performed; and generating and providing, when the conveyance processing is terminated and the game processing is started, the second image further including a plurality of messages indicating game information of the game based on the obtained data such that the plurality of messages are automatically sequentially shown.

2. The non-transitory storage medium encoded with a computer readable program according to claim 1, wherein
whether to perform the conveyance processing or to perform the game processing and generate and provide the second image further including the plurality of messages such that the plurality of messages are automatically sequentially shown is determined based on the obtained data.

3. The non-transitory storage medium encoded with a computer readable program according to claim 2, wherein
when the data obtained while the game processing is performed includes specific data, the conveyance processing is performed, and
when the data obtained while the game processing is performed does not include the specific data, the game processing is performed and the second image further including the plurality of messages is generated and provided such that the plurality of messages are automatically sequentially shown.

4. The non-transitory storage medium encoded with a computer readable program according to claim 3, wherein
at time of start-up of the game, it is determined to perform the conveyance processing regardless of whether the obtained data includes the specific data.

5. The non-transitory storage medium encoded with a computer readable program according to claim 3, wherein
when the obtained data includes the specific data and when the user provides the second operation input while the conveyance processing is performed, the conveyance processing is not terminated.

6. The non-transitory storage medium encoded with a computer readable program according to claim 5, wherein
when the obtained data includes the specific data and non-specific data, conveyance processing for generating and providing a first image including a plurality of first messages indicating game information of the game based on the obtained specific data such that the plurality of first messages are sequentially shown is performed, and thereafter conveyance processing for generating and providing a first image including a plurality of second messages indicating game information of the game based on the obtained non-specific data such that the plurality of second messages are sequentially shown is further performed, and
when the second operation input by the user is provided while the conveyance processing for generating and providing the first image including the plurality of second messages such that the plurality of second messages are sequentially shown is performed, the conveyance processing is terminated and the game processing is started.

7. The non-transitory storage medium encoded with a computer readable program according to claim 1, wherein
the second image further including a plurality of messages indicating game information of the game is generated and provided such that the plurality of messages are automatically sequentially shown in an outer area other than a central area.

8. The non-transitory storage medium encoded with a computer readable program according to claim 1, wherein
when the conveyance processing is terminated and the game processing is started, the second image further including a message indicating game information subsequent to game information corresponding to a message conveyed in immediately preceding conveyance processing is generated and provided such that the messages are automatically sequentially shown from the subsequent message.

9. The non-transitory storage medium encoded with a computer readable program according to claim 1, wherein
conveyance processing for generating and providing the first image obtained by image pick-up of the virtual space by a second virtual camera fixed at a prescribed position in the virtual space is performed.

10. The non-transitory storage medium encoded with a computer readable program according to claim 1, wherein
when a third operation input by the user is provided while the game processing is performed, the game processing is terminated and the conveyance processing is started.

11. A game device, the game device
obtaining data for determining a message to be shown while a game is running,
performing conveyance processing for generating and providing a first image including a plurality of messages indicating game information of the game based on the obtained data such that the plurality of messages are sequentially shown,
performing game processing after the conveyance processing ends, the game processing including movement control processing for moving a player character in a virtual space based on a first operation input by a user, first control processing based on a position in the virtual space of the player character, and image generation processing for generating a second image including at least an image based on a first virtual camera that moves together with the player character,
terminating the conveyance processing and starting the game processing when a second operation input by the user is provided while the conveyance processing is performed, and
generating and providing, when the conveyance processing is terminated and the game processing is started, the second image further including a plurality of messages indicating game information of the game based on the obtained data such that the plurality of messages are automatically sequentially shown.

12. A method of controlling a game device, the method comprising:
obtaining data for determining a message to be shown while a game is running;
performing conveyance processing for generating and providing a first image including a plurality of messages indicating game information of the game based on the obtained data such that the plurality of messages are sequentially shown;
performing game processing after the conveyance processing ends, the game processing including movement control processing for moving a player character in a virtual space based on a first operation input by a user, first control processing based on a position in the virtual space of the player character, and image generation processing for generating a second image including at least an image based on a first virtual camera that moves together with the player character; and terminating the conveyance processing and starting the game processing when a second operation input by the user is provided while the conveyance processing is performed, wherein the performing game processing includes generating and providing, when the conveyance processing is terminated and the game processing is started, the second image further including a plurality of messages indicating game information of the game based on the obtained data such that the plurality of messages are automatically sequentially shown.

\* \* \* \* \*